US012563292B2

(12) United States Patent
Jeon et al.

(10) Patent No.: US 12,563,292 B2
(45) Date of Patent: Feb. 24, 2026

(54) IMAGE SENSOR AND METHOD OF PERFORMING AUTOFOCUS OPERATION

(71) Applicant: SK hynix Inc., Icheon-si (KR)

(72) Inventors: Jae Hwan Jeon, Icheon-si (KR); Ja Min Koo, Icheon-si (KR); Ji Su Kim, Icheon-si (KR); Tae Hyun Kim, Icheon-si (KR); Jong Hyun Bae, Icheon-si (KR); Woo Young Jeong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 105 days.

(21) Appl. No.: 18/678,869

(22) Filed: May 30, 2024

(65) Prior Publication Data

US 2025/0133291 A1 Apr. 24, 2025

(30) Foreign Application Priority Data

Oct. 18, 2023 (KR) ........................ 10-2023-0139608

(51) Int. Cl.
*H04N 23/67* (2023.01)

(52) U.S. Cl.
CPC ................................ *H04N 23/672* (2023.01)

(58) Field of Classification Search
CPC ............................ H04N 23/672; H04N 23/675
See application file for complete search history.

(56) References Cited

U.S. PATENT DOCUMENTS

| | | | |
|---|---|---|---|
| 11,381,743 B1 * | 7/2022 | Mahbub | H04N 23/65 |
| 2016/0247258 A1 * | 8/2016 | Liou | G06T 1/60 |
| 2023/0171509 A1 * | 6/2023 | Varghese | G06T 5/50 |
| | | | 348/222.1 |
| 2023/0262322 A1 * | 8/2023 | Hou | G06V 10/761 |
| | | | 348/222.1 |
| 2023/0370752 A1 * | 11/2023 | Lee | H04N 23/617 |

FOREIGN PATENT DOCUMENTS

| | | |
|---|---|---|
| KR | 1020170067634 A | 6/2017 |
| KR | 102460838 B1 | 10/2022 |

* cited by examiner

*Primary Examiner* — Cynthia Segura
(74) *Attorney, Agent, or Firm* — WILLIAM PARK AND ASSOCIATES LTD.

(57) ABSTRACT

An image sensor includes an image generator including pixels and configured to generate image data having pixel values corresponding to the pixels, and a focus manager configured to generate a first phase detection image and a second phase detection image based on pixel values for phase detection pixels, to determine a first target region of interest including a preset object within regions of interest in the first phase detection image based on a result of performing first pixel value sum operations for pixels included in regions of interest, determine a second target region of interest corresponding to the first target region of interest in the second phase detection image, and to perform an auto-focus operation based on a result of performing second pixel value sum operations for pixels in first and second target regions of interest.

20 Claims, 9 Drawing Sheets

Figure 5:
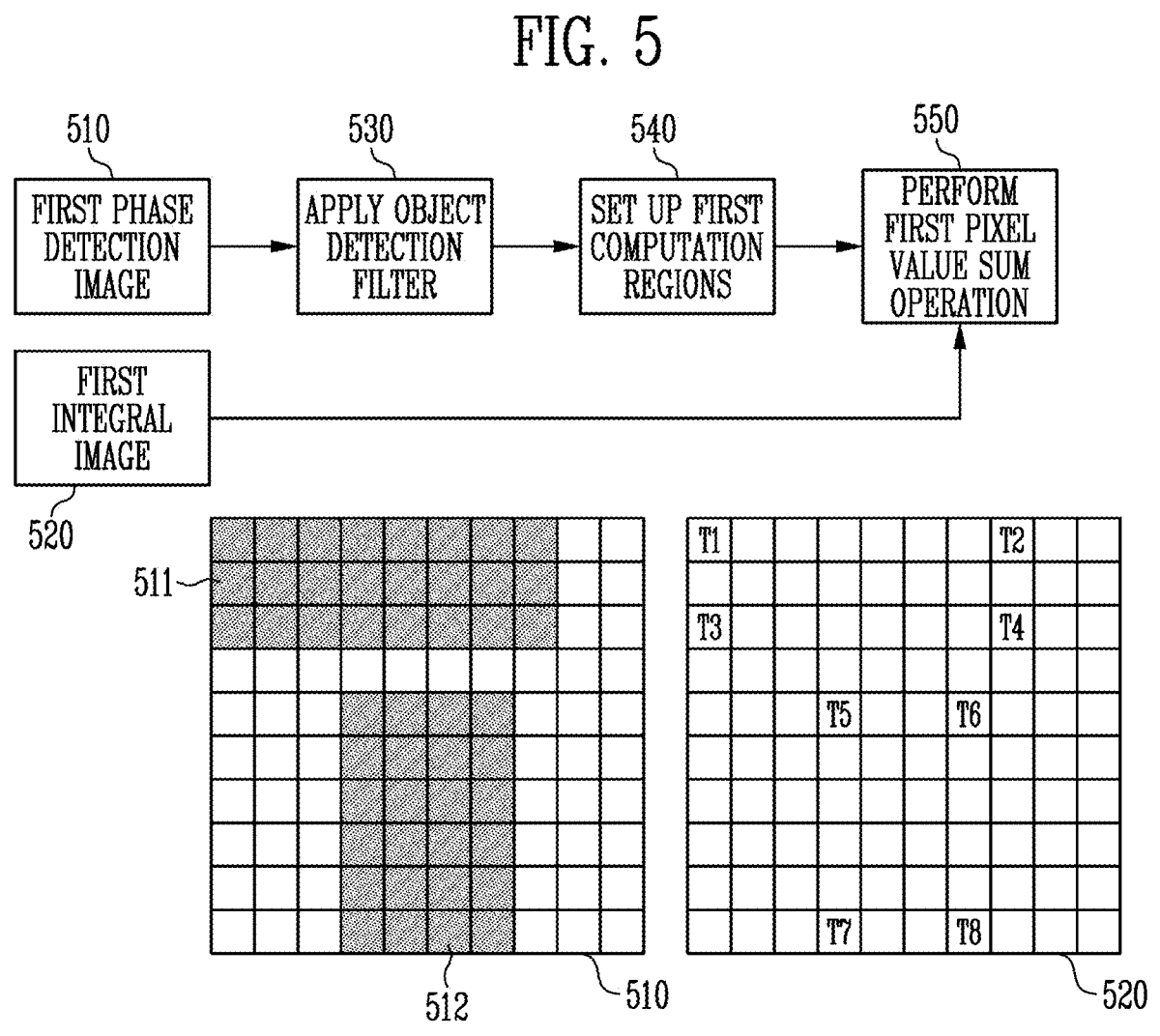

| FIRST PHASE DETECTION IMAGE |

530

| APPLY OBJECT DETECTION FILTER |

540

| SET UP FIRST COMPUTATION REGIONS |

550

| PERFORM FIRST PIXEL VALUE SUM OPERATION |

| FIRST INTEGRAL IMAGE |

Figure 6:
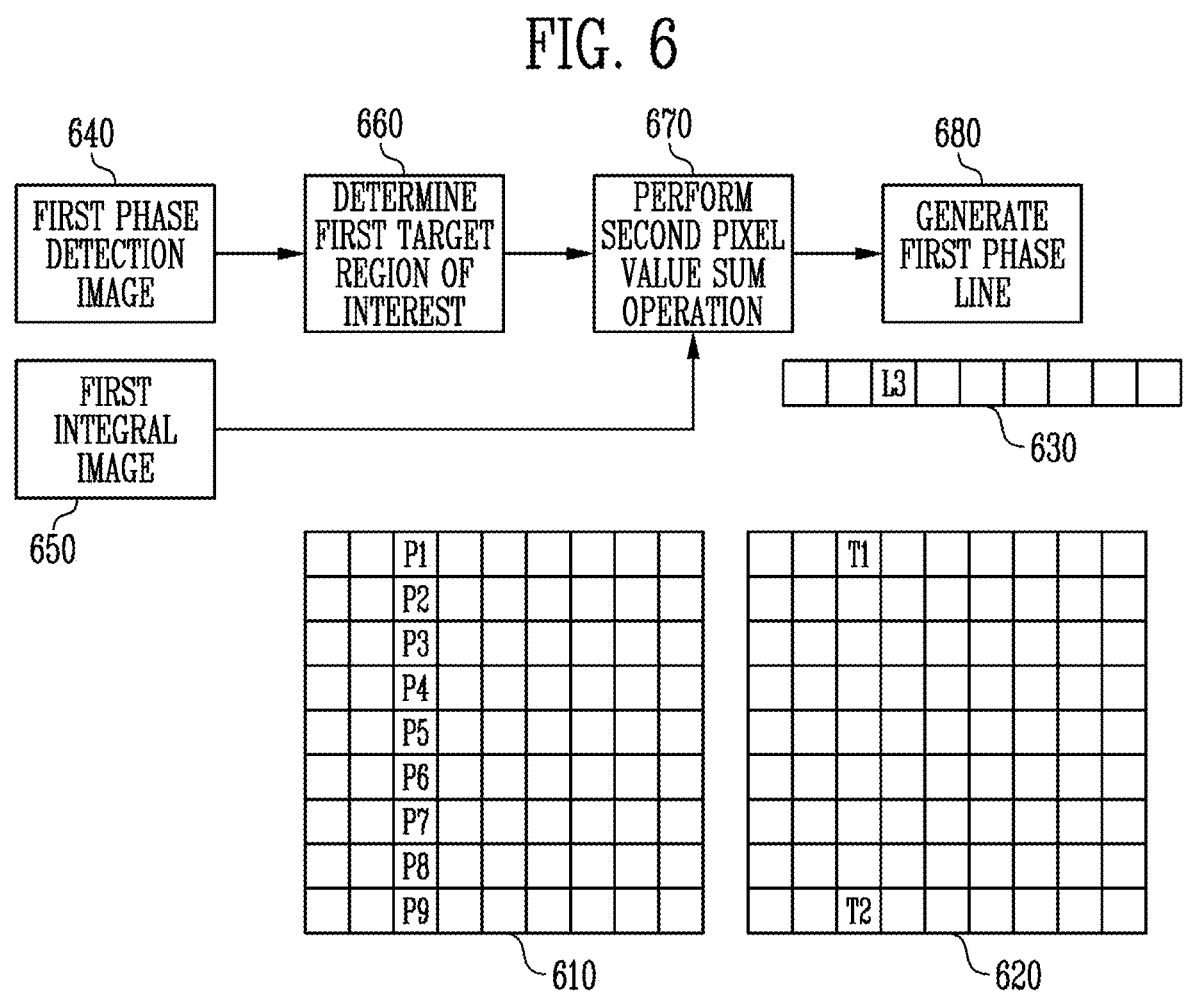

| FIRST PHASE DETECTION IMAGE |

660

| DETERMINE FIRST TARGET REGION OF INTEREST |

670

| PERFORM SECOND PIXEL VALUE SUM OPERATION |

680

| GENERATE FIRST PHASE LINE |

650

| FIRST INTEGRAL IMAGE |

| | | L3 | | | | | | |

630

610

| | P1 | | | | | |
| | P2 | | | | | |
| | P3 | | | | | |
| | P4 | | | | | |
| | P5 | | | | | |
| | P6 | | | | | |
| | P7 | | | | | |
| | P8 | | | | | |
| | P9 | | | | | |

620

| | T1 | | | | | |
| | | | | | | |
| | | | | | | |
| | | | | | | |
| | | | | | | |
| | | | | | | |
| | | | | | | |
| | | | | | | |
| | T2 | | | | | |

FIG. 7

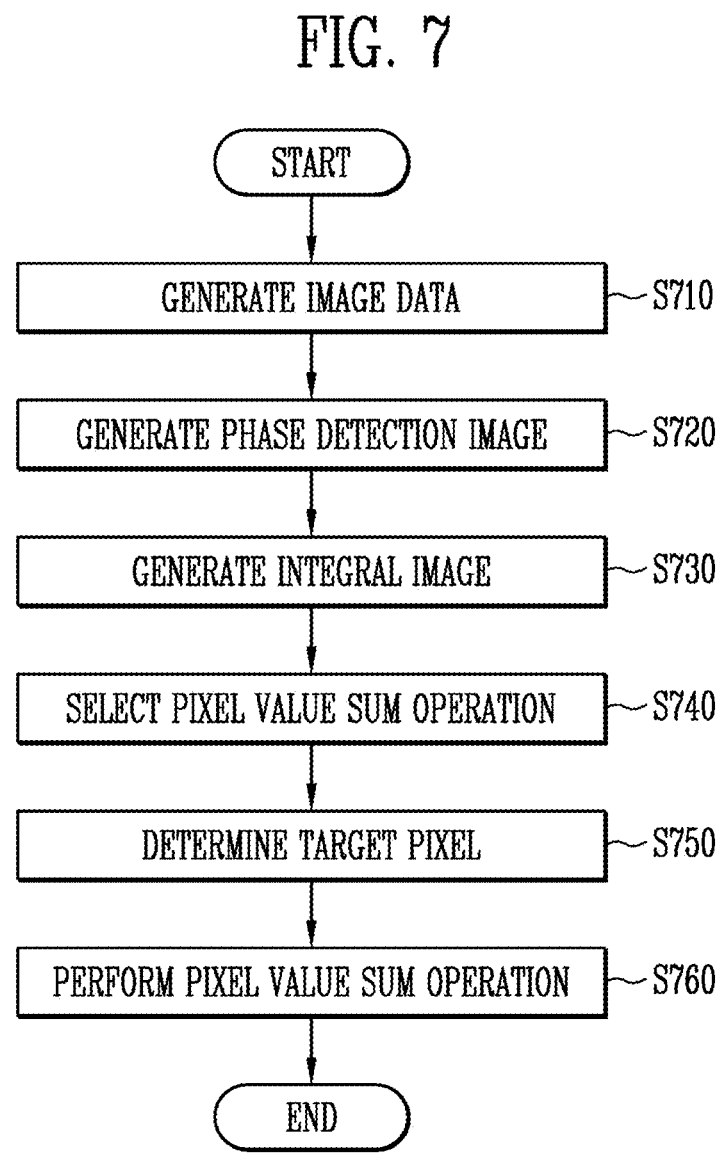

START

↓

GENERATE IMAGE DATA — S710

↓

GENERATE PHASE DETECTION IMAGE — S720

↓

GENERATE INTEGRAL IMAGE — S730

↓

SELECT PIXEL VALUE SUM OPERATION — S740

↓

DETERMINE TARGET PIXEL — S750

↓

PERFORM PIXEL VALUE SUM OPERATION — S760

↓

END

IMAGE SENSOR AND METHOD OF PERFORMING AUTOFOCUS OPERATION

CROSS-REFERENCE TO RELATED APPLICATION

The present application claims priority under 35 U.S.C. § 119(a) to Korean patent application number 10-2023-0139608, filed on Oct. 18, 2023, in the Korean Intellectual Property Office, which application is incorporated herein by reference in its entirety.

BACKGROUND

1. Technical Field

Various embodiments of the present disclosure generally relate to image sensors, and more particularly to an image sensor and method of performing an autofocus operation.

2. Related Art

Image sensors may be generally classified as charge coupled device (CCD) image sensors or complementary metal oxide semiconductor (CMOS) image sensors. CMOS image sensors having inexpensive manufacturing cost, little power consumption, and ease of integration with peripheral circuits are receiving attention these days.

Image sensors may generate image data. The image sensor may detect an object in an image by using the image data or performing an autofocus operation by controlling a lens utilized with the image sensor. The image sensor may perform an image processing operation by performing operations on pixel values based on the image data.

SUMMARY

An embodiment of the present disclosure may provide for an image sensor. The image sensor may include an image generator including a plurality of pixels and configured to generate image data having pixel values corresponding to the a plurality of pixels, and a focus manager configured to generate a first phase detection image and a second phase detection image based on pixel values for phase detection pixels among the pixels, determine a first target region of interest including a preset object within regions of interest in the first phase detection image based on a result of performing first pixel value sum operations for pixels included in the regions of interest, determine a second target region of interest corresponding to the first target region of interest in the second phase detection image, and to perform an autofocus operation based on a result of performing second pixel value sum operations for pixels included in the first target region of interest and the second target region of interest, wherein the focus manager is configured to generate a first integral image obtained by cumulatively adding up pixel values for pixels included in the first phase detection image, to generate a second integral image obtained by cumulatively adding up pixel values for pixels included in the second phase detection image, and to perform at least one sum operation among the first pixel value sum operations and the second pixel value sum operations based on target pixel values for target pixels included in the first integral image and the second integral image.

An embodiment of the present disclosure may provide for a method of performing an operation in an image sensor. The method may include generating image data including pixel values corresponding to pixels in an image, generating a phase detection image having a phase difference based on pixel values for phase detection pixels included in the image data, generating an integral image corresponding to the phase detection image, selecting a sum operation including adding up pixel values for pixels included in a region of the phase detection image among operations performed on the phase detection image, determining target pixels corresponding to the region within pixels included in the integral image, and performing the sum operation based on pixel values for the target pixels.

An embodiment of the present disclosure may provide for an image sensor comprising a pixel array including a plurality of pixels corresponding to a plurality of pixel values and a focus manager configured to: generate a first phase detection image and a second phase detection image, to determine a first target region of interest including a preset object within regions of interest in the first phase detection image based on a result of performing first pixel value sum operations for pixels included in the regions of interest, to determine a second target region of interest corresponding to the first target region of interest in the second phase detection image, to perform an autofocus operation based on a result of performing second pixel value sum operations for pixels included in the first target region of interest and the second target region of interest, to generate a first integral image based on pixel values for pixels in the first phase detection image, to generate a second integral image based on pixel values for pixels in the second phase detection image, and to perform at least one sum operation among the first pixel value sum operations and the second pixel value sum operations based on target pixel values for target pixels included in the first integral image and the second integral image.

BRIEF DESCRIPTION OF THE DRAWINGS

FIG. 2 is a diagram illustrating an autofocus operation of a focus manager according to an embodiment of the present disclosure.

FIG. 5 is a diagram illustrating first pixel value sum operations according to an embodiment of the present disclosure.

FIG. 6 is a diagram illustrating second pixel value sum operations according to an embodiment of the present disclosure.

FIG. 7 is a flowchart illustrating a method of performing an operation in an image sensor according to an embodiment of the present disclosure.

DETAILED DESCRIPTION

Specific structural or functional descriptions in embodiments according to the concept of the present disclosure, introduced in the present specification or application, are provided only for description of the embodiments of the present disclosure. The embodiments according to the concepts of the present disclosure may be implemented in various forms and should not be construed as being limited to the embodiments described in the specification or drawings.

Embodiments of the present disclosure are described with reference to the accompanying drawings in order to provide details such that those skilled in the art to which the present disclosure pertains may easily practice the present disclosure.

Various embodiments of the present disclosure are directed to an image sensor capable of performing a sum operation on pixel values by using an integral image and a method of performing an autofocus operation by using a result of performing the sum operation. Performance of the image sensor may be improved by increasing processing speed of the operations performed by the image sensor.

Figure 1:
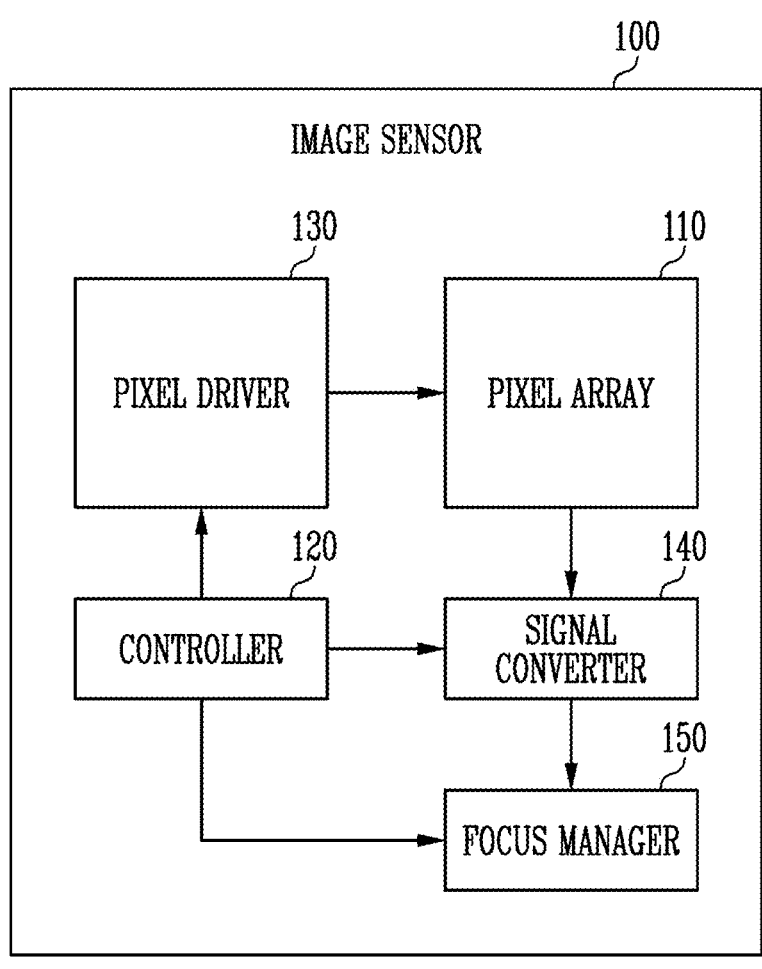
FIG. 1 is a diagram illustrating an image sensor according to an embodiment of the present disclosure.

FIG. 1 is a diagram illustrating an image sensor according to an embodiment of the present disclosure.

Referring to FIG. 1, an image sensor 100 includes a pixel array 110, a controller 120, a pixel driver 130, a signal converter 140 and a focus manager 150. The image sensor 100 generates image data based on a received optical signal and sends the image data to an image signal processor for performing, for example, an operation of enhancing image quality. The pixel array 110, the controller 120, the pixel driver 130, and/or the signal converter 140 may be referred to as an image generator.

The pixel array 110 includes a plurality of pixels arranged in the form of an array in rows and columns. Each pixel includes a photoelectric element that converts an optical signal, such as light, into an electric signal. Each pixel may be associated with a microlens that concentrates light and a color filter having a color pattern, for example, a Bayer filter or other color filter. Electric signals generated by the pixels may be analog signals. The generated analog signal may be adjusted in magnitude based on an analog gain value. As the analog gain value increases, the magnitude of the analog signal increases. As the magnitude of the analog signal increases, a percentage of noise included in the signal may increase. The pixel array 110 sends the analog electric signal to the signal converter 140.

In an embodiment of the present disclosure, some of a plurality of pixels included in the pixel array 110 may be phase detection pixels. Normal pixels are pixels each corresponding to one micro lens, and the phase detection pixels are pixels that share the same micro lens, in other words, one micro lens directs light onto two or more phase detection pixels.

The controller 120 controls general operation of the image sensor 100. The controller 120 may generate control signals to control operation timing of the image sensor 100 or adjust the analog gain value through the pixel driver 130. The controller 120 may generate control signals to control operation of the signal converter 140. The controller 120 may generate and apply a clock signal or ramp signal to the signal converter 140. The controller 120 may generate control signals to perform a pixel value sum operation and control an autofocus operation by the focus manager 150.

The pixel driver 130 outputs control signals for controlling the pixels included in the pixel array 110. The pixels may produce analog electric signals in response to the control signals generated by the pixel driver 130.

The signal converter 140 converts the analog electric signal output from the pixel array 110 into a digital signal. The signal converter 140 may perform a correlated double sampling to cancel noise included in the analog electric signal. The signal converter 140 may generate the digital signal by comparing the ramp signal with the analog electric signal. In an embodiment of the present disclosure, the digital signal is referred to as image data. The image data includes pixel values for corresponding pixels. The image data may be sent to the focus manager 150.

The focus manager 150 performs an autofocus operation based on the received image data. The autofocus operation includes an operation of bringing a lens into a focus by controlling the lens included with the image sensor 100. The focus manager 150 may detect an object included in an image and determine a region having the object to be a target region of interest. The focus manager 150 may perform an autofocus operation based on the target region of interest. In an embodiment of the present disclosure, the object may be a face.

The focus manager 150 performs sum operations that are included in performing a face detection operation and an autofocus operation by using an integral image. A pixel value for pixels included in the integral image may be a sum of pixel values from an origin pixel up to and including a representative pixel. The focus manager 150 may increase operation processing speed for the face detection operation and autofocus operation by determining target pixels within the pixels included in the integral image and performing sum operations on the target pixels.

Figure 2:
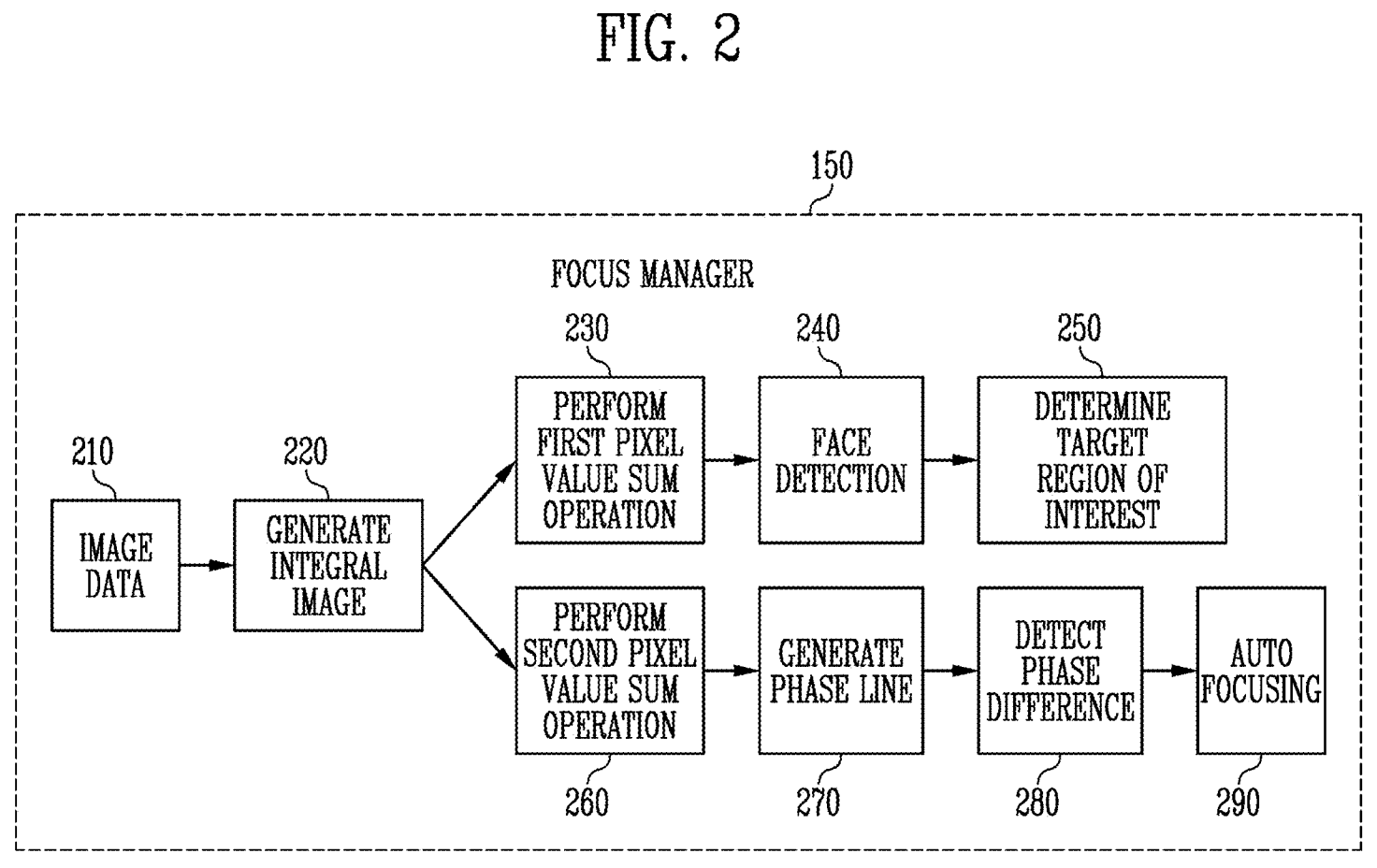

FIG. 2 is a diagram illustrating an autofocus operation of a focus manager according to an embodiment of the present disclosure.

Referring to FIG. 2, the focus manager 150 generates an integral image and performs a pixel value sum operation on the integral image. The focus manager 150 may perform a face detection operation based on a result of the pixel value sum operation or perform an autofocus operation by detecting or determining a phase difference.

The focus manager 150 receives 210 image data including pixel values for corresponding pixels. The focus manager 150 may generate a phase detection image based on the image data. The focus manager 150 generates 220 an integral image corresponding to the phase detection image by cumulatively adding up pixel values for pixels included in the phase detection image.

The focus manager 150 performs 230 a first pixel value sum operation based on the integral image. The focus manager 150 may apply a filter determined according to an object to be detected to the phase detection image. In an embodiment of the present disclosure, the object to be detected is a face. A filter used for face detection 240 includes a pattern corresponding to a face. For example, the pattern of the filter may be a pattern in which components of the filter are successively arranged with 1 s or −1 s.

The focus manager 150 may set up or determine computation regions corresponding to the pattern of the filter in the phase detection image. The focus manager 150 may determine sum operations on pixel values included in the respective computation regions to be first pixel value sum operations.

The focus manager 150 may perform operations utilized during face detection based on a result of performing the first pixel value sum operations. The focus manager 150 may perform an operation on a strong classifier for detecting an object included in the image based on a result of operation on a weak classifier for detecting a feature included in the image. Operations, classifiers, and filters for detecting a face in an image are known technologies.

The focus manager 150 detects or determines 250 at least one target region of interest having a face within regions of interest in the phase detection image. The focus manager 150 may perform an autofocus operation on the target region of interest. In an embodiment of the present disclosure, when no face is detected in the phase detection image, a preset region of interest may be determined to be the target region of interest. For example, among the dead center or regions of interest in the image, for example, the brightest region may be the target region of interest.

The focus manager 150 may generate 270 a phase line based on the target region of interest. The phase line may be generated based on average pixel values for pixels included in the corresponding columns within pixels included in the target region of interest. The focus manager 150 may determine or perform 260 a second sum of pixel values for the pixels included in one column or a single column within the pixels included in the target region of interest.

The focus manager 150 may detect or determine 280 a phase difference based on the phase line. The focus manager 150 may perform 290 an autofocus operation of the image sensor 100 based on the phase difference. The technology of detecting or determining a phase difference based on the phase line and performing an autofocus operation based on the phase difference is known.

Figure 3:
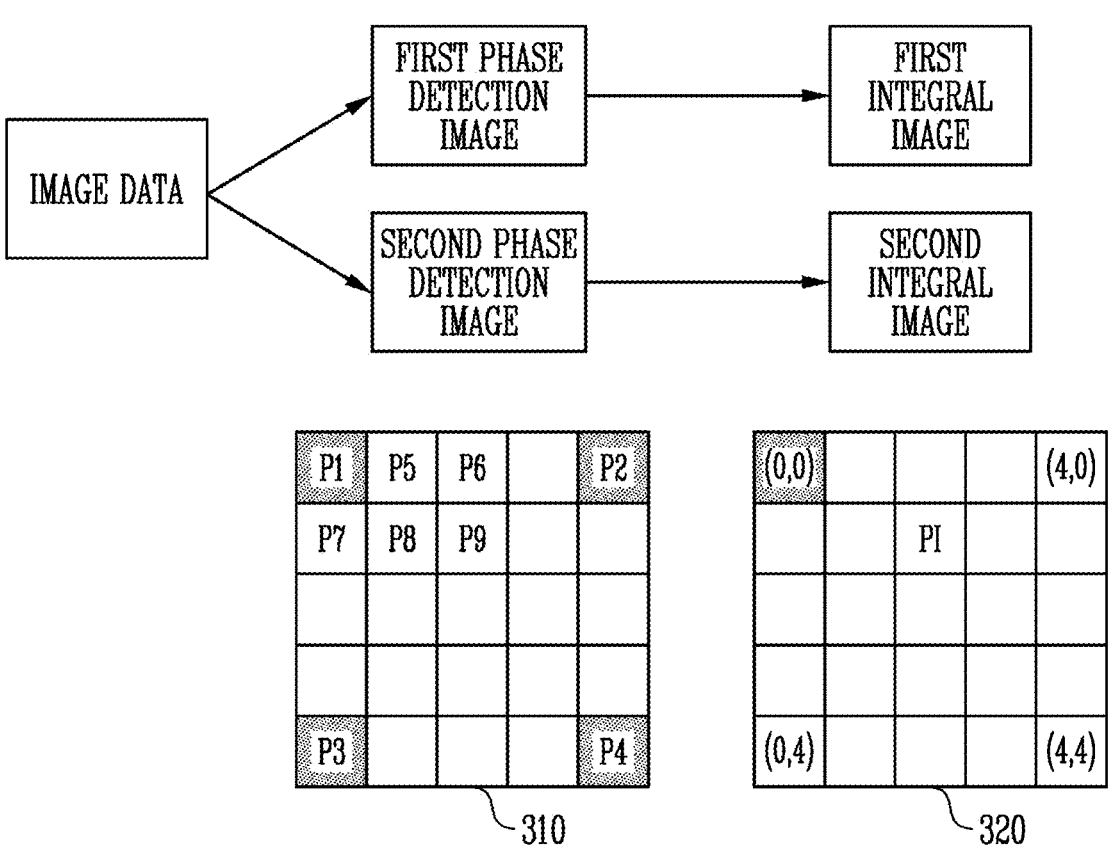
FIG. 3 is a diagram illustrating an integral image according to an embodiment of the present disclosure.

FIG. 3 is a diagram illustrating an integral image according to an embodiment of the present disclosure.

Referring to FIG. 3, the focus manager 150 generates a first phase detection image and a second phase detection image based on pixels values of phase detection pixels among the pixels. A phase difference is present between the first phase detection image and the second phase detection image. In an embodiment of the present disclosure, the first phase detection image is an image on the left (left image), and the second phase detection image is an image on the right (right image). The phase difference may refer to a difference in the same object between the left image and the right image. The phase difference between the left image and the right image varies depending on the distance between the image sensor 100 and the object included in the image. The farther the distance between the object and the image sensor 100, the larger the phase difference.

The focus manager 150 may determine one of four corners of the first phase detection image to be an origin. The focus manager 150 may determine a first integral region where pixel values are added up from a first origin pixel corresponding to the origin in the first phase detection image. The focus manager 150 may determine a pixel farthest from the first origin pixel in the first integral region to be a first representative pixel of the first integral region. The focus manager 150 may determine a pixel value of a first integral pixel having the same location as the first representative pixel within pixels included in a first integral image to be a sum of pixel values included in the first integral region.

In the example of FIG. 3, a first integral image 320 is produced from a first phase detection image 310. Among four corners P1, P2, P3, and P4 of the first phase detection image 310, P1 is selected as the origin in this example. In the first integral image 320, a location of the first origin pixel corresponding to the origin P1 is (0, 0). How to determining a pixel value of a first integral pixel PI of the first integral image 320 may be performed utilizing other methods. The focus manager 150 selects the first integral region to include P1, P5, P6, P7, P8, and P9 in the first phase detection image 310 in the example of FIG. 3. The focus manager 150 determines the first representative pixel of the first integral region to be P9. The focus manager 150 determines a pixel value of the first integral pixel PI in the first integral image 320, having the same location as the first representative pixel P9, to be a sum of pixel values for P1, P5, P6, P7, P8, and P9. The focus manager 150 generates the first integral image 320 by determining pixel values of all the pixels in the first integral image 320 utilizing the same method.

The focus manager 150 generates a second integral image corresponding to the second phase detection image. The focus manager 150 determines a second origin pixel corresponding to the origin within pixels included in the second phase detection image. The focus manager 150 sets up a second integral region where pixel values are added up from the second origin pixel in the second phase detection image. The focus manager 150 determines a pixel farthest from the second origin pixel in the second integral region to be a second representative pixel of the second integral region. The focus manager 150 determines a pixel value of a second integral pixel having the same location as the second representative pixel within pixels included in a second integral image to be a sum of pixel values included in the second integral region. The focus manager 150 generates the second integral image by determining pixel values of all the pixels in the second integral image utilizing the same method.

Figure 4:
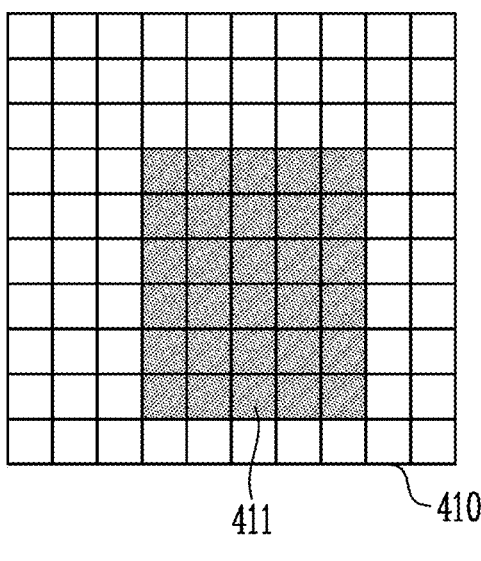
FIG. 4 is a diagram illustrating an integral image and pixel value sum operation according to an embodiment of the present disclosure.
Figure 4:
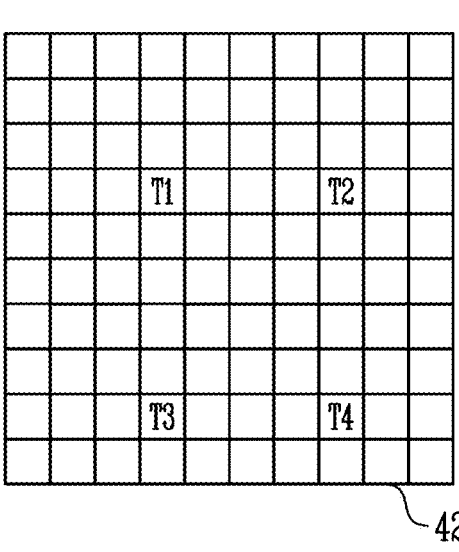

FIG. 4 is a diagram illustrating an integral image and pixel value sum operation according to an embodiment of the present disclosure.

Referring to FIG. 4, a phase detection image 410 and an integral image 420 are shown. In the phase detection image 410, a computation region 411 is selected. A sum operation on pixel values included in the computation region 411 is performed.

When only the phase detection image 410 is used, pixel values included in the computation region 411 may be added up directly to perform the sum operation on the pixel values. In the example when the sum operation on pixel values for pixels included in a region in the same image is to be performed multiple times, the sum operation may be performed by using the integral image 420.

In the example of performing the sum operation using the integral image 420, the focus manager 150 determines four target pixels corresponding to the computation region 411. The focus manager 150 determines four target pixels T1, T2, T3, and T4 corresponding to the corners of the computation region 411 within the pixels included in the integral image 420. The focus manager 150 determines a result of the sum operation on the pixel values included in the computation region 411 to be (a pixel value of T1+a pixel value of T4)−(a pixel value of T2+a pixel value of T3) in this example.

When a plurality of computation regions are selected for the phase detection image 410 and sum operations on pixel values included in the computation regions are utilized, the method of determining a result of the sum operations using the integral image 420 may result in faster operation processing speed than the speed of a method of directly performing the sum operation on the pixel values that may, for example, result in frame delays and numerous repeated calculations.

FIG. 5 is a diagram illustrating first pixel value sum operations according to an embodiment of the present disclosure.

Referring to FIG. 5, the focus manager 150 performs 550 first pixel value sum operations to detect an object included in a first phase detection image 510 based on a first integral image 520. In this example, the focus manager 150 attempts to detect a face included in the first phase detection image 510.

The focus manager 150 applies 530 a filter for detecting the face to the first phase detection image 510. The filter for detecting the face may have a pattern in which the components are successively arranged with 1 s or −1 s. When the components of the filter are 1 s or −1 s, pixel values of the first phase detection image 510 may be maintained. The focus manager 150 selects 540 first computation regions 511 and 512 including pixels whose pixel values of the first phase detection image 510 are maintained and added together in the first phase detection image 510.

In FIG. 5, for example, the computation region 511 used for horizontal line detection and the computation region 512 used for vertical line detection is shown. Pixels included in the first computation regions 511 and 512 are pixels whose pixel values are multiplied with components 1 s of the filter and subsequently added together or multiplied with components −1 s of the filter.

The focus manager 150 determines target pixels corresponding to each of the first computation regions 511 and 512 within the pixels included in the first integral image 520. The focus manager 150 determines four target pixels for each of the first computation regions 511 and 512. For example, the focus manager 150 determines or selects target pixels T1, T2, T3, and T4 corresponding to the computation region 511. The focus manager 150 determines or selects target pixels T5, T6, T7, and T8 corresponding to the computation region 512.

The focus manager 150 uses pixel values of the four target pixels to determine sum operations on the pixel values included in the first computation regions 511 and 512. The sum operations on the pixel values included in the first computation regions 511 and 512 are examples of the first pixel value sum operations. A method of determining the result of the sum operation using pixel values for the target pixels of the first integral image 520 is described with respect to FIG. 4.

FIG. 6 is a diagram illustrating second pixel value sum operations according to an embodiment of the present disclosure.

Referring to FIG. 6, the focus manager 150 generates a phase line corresponding to a target region of interest. The focus manager 150 performs an autofocus operation by using the phase line. In FIG. 6, a first target region of interest 610 and a portion 620 of an integral image 650 corresponding to the first target region of interest 610 are shown. In an embodiment of the present disclosure, a first phase line 630 and a second phase line are generated, but for simplicity of explanation, a procedure for generating only the first phase line 630 is shown in FIG. 6.

The focus manager 150 determines 660 the first target region of interest 610 including a face within regions of interest in the first phase detection image 640 based on a result of performing the first pixel value sum operations. The focus manager 150 generates 680 the first phase line 630 based on average pixel values for pixels included in the corresponding columns within pixels included in the first target region of interest 610. In an embodiment of the present disclosure, sums of pixel values for pixels included in the respective columns in the region of interest are the second pixel value sum operations 670.

For example, the focus manager 150 determines a pixel value for pixel L3 in the first phase line 630. The pixel value of L3 is an average pixel value for pixels P1, P2, P3, P4, P5, P6, P7, P8, and P9 included in one column in the first target region of interest 610. The focus manager 150 detects a first pixel T1 and a last pixel T2 included in one column in the portion 620 of the integral image. The focus manager 150 determines that a sum of the pixel values of the pixels P1, P2, P3, P4, P5, P6, P7, P8, and P9 included in one column is a difference between a pixel value of T2 and a pixel value of T1.

The focus manager 150 determines average pixel values for pixels included in the corresponding columns in the region of interest based on the second pixel value sum operations. The focus manager 150 generates the first phase line 630 by determining pixel values of all the pixels in the first phase line 630 utilizing the same method.

The focus manager 150 determines a second target region of interest in the second phase detection image corresponding to the first target region of interest in the first phase detection image. The focus manager 150 generates the second phase line based on the second target region of interest and a second integral image utilizing the same method used to generate the first phase line 630.

The focus manager 150 detects or determines a phase difference based on the first phase line 630 and the second phase line. The focus manager 150 performs an autofocus operation based on the detected or determined phase difference. Autofocus methods performed by an image sensor are known.

FIG. 7 is a flowchart illustrating a method of performing an operation in an image sensor according to an embodiment of the present disclosure.

Referring to FIG. 7, the image sensor performs sum operations to add up pixel values for pixels included in a region of a generated image. The image sensor determines a result of the sum operations by generating an integral image.

The image sensor generates S710 image data. The image data may include pixel values corresponding to the respective pixels. Some of the pixels may be phase detection pixels.

The focus manager generates S720 a phase detection image. The focus manager generates a first phase detection image and a second phase detection image based on phase detection pixel values, wherein a phase difference exists between the first phase detection image and the second phase detection image.

The focus manager generates S730 a first integral image corresponding to the first phase detection image and a second integral image corresponding to the second phase detection image. Generating the first integral image and the second integral image is described with respect to FIG. 2 and FIG. 3.

The focus manager selects S740 a pixel value sum operation including the option of adding up pixel values for pixels included in a region among operations performed for the first phase detection image and the second phase detection image. The focus manager selects first pixel value sum operations used to detect a preset object such as a face included in the first phase detection image. For example, selecting a sum operation may include generating filters for detecting a preset object, such as a face, and determining an operation corresponding to a component of a filter that maintains a pixel value among components of the filters to be the sum operation. The component of the filter that maintains the pixel value is 1 or −1. The filter having the components 1 or −1 are applied to a region. The focus manager selects second pixel value sum operations used to generate a first phase line and a second phase line. Selecting a sum operation may include detecting a target region of interest including a preset object, such as a face, within regions of interest in the phase detection image and determining a sum of pixel values for pixels included in one column within pixels included in the target region of interest to be the sum operation. In one example, performing the sum operation includes calculating a difference between a sum of pixel values for a pixel closest to the origin pixel and a pixel farthest from the origin pixel among the four target pixels and a sum of remaining pixel values and determining a result of the sum operation to be the difference in sum of the pixel values. The focus manager selects the first pixel value sum operations and the second pixel value sum operations as described with respect to FIG. 5 and FIG. 6.

The focus manager determines S750 target pixels used for the pixel value sum operation. The focus manager selects computation regions in the first phase detection image and the second phase detection image. The focus manager determines target pixels corresponding to the computation regions within pixels included in the first integral image and the second integral image. The focus manager determines the target pixels as described with respect to FIG. 5 and FIG. 6.

The focus manager performs S760 the first pixel value sum operations and the second pixel value sum operations based on the first integral image and the second integral image. The focus manager uses pixel values for the target pixels to determine results of the first pixel value sum operations and the second pixel value sum operations. The focus manager determines the results of the first pixel value sum operations and the second pixel value sum operations as described with respect to FIG. 5 and FIG. 6.

Figure 8:
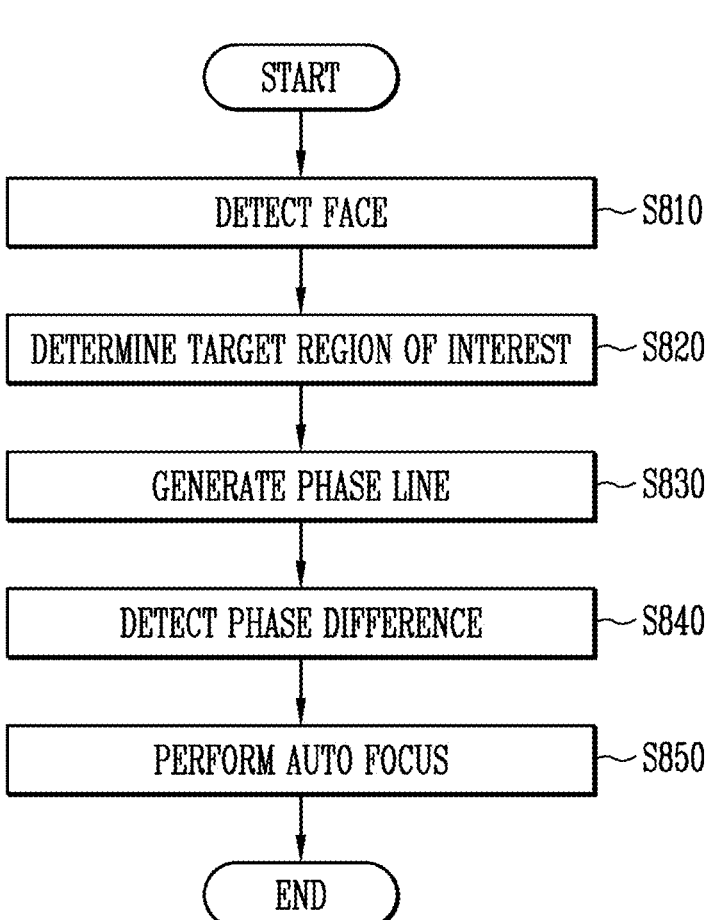
FIG. 8 is a flowchart illustrating a method of performing an autofocus operation in an image sensor according to an embodiment of the present disclosure.

FIG. 8 is a flowchart illustrating a method of performing an autofocus operation in an image sensor according to an embodiment of the present disclosure.

Referring to FIG. 8, the focus manager detects a face included in a first phase detection image and performs an autofocus operation based on the detected region. Although the face detection operation is performed based on the first phase detection image in an embodiment of the present disclosure, the face detection operation may be performed based on the second phase detection image.

The focus manager detects S810 a face within the first phase detection image. The focus manager may apply filters determined according to a detected face to the phase detection image.

The focus manager determines S820 a first target region of interest including a face within regions of interest selected in the first phase detection image. When no face is included in the phase detection image, a preset region of interest may be identified as the first target region of interest. The focus manager determines a second target region of interest in the second phase detection image corresponding to the first target region of interest.

The focus manager generates S830 a first phase line based on the first target region of interest and a second phase line based on the second target region of interest. The phase line may be generated based on average pixel values for pixels included in the respective columns within pixels included in the target region of interest.

The focus manager detects or determines S840 a phase difference between the first phase detection image and the second phase detection image based on the first phase line and the second phase line.

The focus manager performs S850 an autofocus operation using the detected or determined phase difference. The focus manager may detect the phase difference by comparing the first phase line with the second phase line such that the detected phase difference is minimized.

Figure 9:
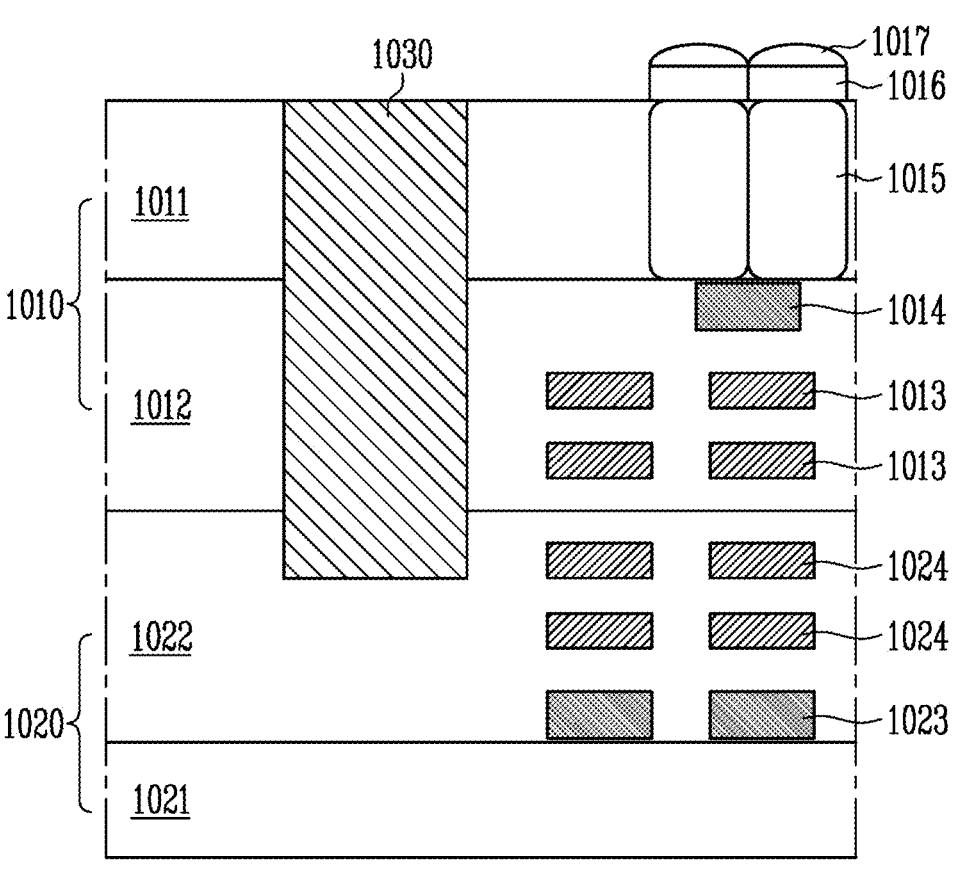
FIG. 9 is a diagram illustrating a stacked image sensor according to an embodiment of the present disclosure.

FIG. 9 is a diagram illustrating a stacked image sensor according to an embodiment of the present disclosure.

Referring to FIG. 9, a sectional view of an image sensor having a stacked structure including an upper element 1010 and a lower element 1020 coupled through a through silicon via 1030 is illustrated. The upper element 1010 includes an upper substrate 1011 and an upper interlayer insulating layer 1012. The lower element 1020 includes a lower substrate 1021 and a lower interlayer insulating layer 1022. The upper element 1010 is stacked on the lower element 1020 such that active sides of the upper element 1010 and the lower element 1020 face each other. The active side refers to a side on which a gate 1014 or 1023 is formed.

The upper substrate 1011 includes a photo diode 1015. A color filter 1016 and a microlens 1017 are formed on or cover the photo diode 1015. The color filter 1016 and the microlens 1017 may each include organic material. The upper substrate 1011 may include a silicon wafer or other semiconductor substrate. In an embodiment of the present disclosure, the upper substrate 1011 may be referred to as a device substrate.

The upper interlayer insulating layer 1012 encloses a transfer gate 1014 and upper metal lines (wires or electrical conductors) 1013. The upper interlayer insulating layer 1012 may comprise at least one of a silicon oxide, a silicon nitride, and a silicon oxynitride. The transfer gate 1014 may be arranged to partially overlap the photo diode 1015. The transfer gate 1014 may transfer electrons produced from the photo diode 1015 to a floating diffusion region.

The lower substrate 1021 may include a silicon wafer. Logic gates 1023 are formed on the lower substrate 1021. The logic gates 1023 may be electronic circuits implemented using firmware that performs a specific operation or using digital circuits that execute a specific algorithm or perform a specific function.

The lower interlayer insulating layer 1022 encloses the logic gates 1023 and lower metal lines 1024. Similar to the upper interlayer insulating layer 1012, the lower interlayer insulating layer 1022 may comprise at least one of a silicon oxide, a silicon nitride, and a silicon oxynitride. The lower metal lines 1024 and the upper metal lines 1013 deliver various electric signals and include metal or conductors.

The through silicon via 1030 is formed through the upper substrate 1011 and the upper interlayer insulating layer 1012 and is formed partially into the lower interlayer insulating layer 1022. The through silicon via 1030 may include a barrier layer on its surface. The through silicon via 1030 is electrically connected to the upper metal lines 1013, the transfer gate 1014, the logic gates 1023, and the lower metal lines 1024.

Referring to FIG. 9 and FIG. 1, the pixel array 110 is included in the upper substrate 1011, and the controller 120, the pixel driver 130, the signal converter 140, and the focus manager 150 are implemented with the lower substrate 1021 and the logic gates 1023 in this example. The focus manager 150 generate a phase detection image having a phase difference based on pixel values for phase detection pixels. The focus manager 150 generates an integral image obtained by cumulatively adding up pixel values for pixels included in the phase detection image. The focus manager 150 determines a target region of interest including a preset object within regions of interest selected in the phase detection image based on results of performing the first pixel value sum operations. The focus manager 150 performs an autofocus operation based on a result of performing the second pixel value sum operations for pixels included in the target region of interest. The focus manager 150 performs at least one sum operation among the first pixel value sum operations and the second pixel value sum operations based on pixel values for target pixels included in the integral image.

The stack structure of the image sensor may be a structure that meets the performance specifications for the image sensor. In an example where an area of the image sensor is restricted, the stack structure provides a space for the circuits that perform operations utilized to secure the restricted area of the image sensor while allowing an area of the pixel array to be secured as much as possible. The stack structure provides for electronic circuits that perform more advanced functions than previously included in the image sensor.

The stacked image sensor perform parts of an image processing operation within the image sensor to improve quality of the generated image data. Because the focus manager 150 is implemented with the lower substrate 1021 and the logic gates 1023, the face detection operation and the autofocus operation may be performed more quickly than when performed by an image signal processor. Because part of the image processing operation is performed by the image sensor, the image signal processor may perform the image processing operation with better performance. As a result, quality of an output image may be improved.

According to the present disclosure, an image sensor capable of increasing processing speed of pixel value sum operations used for an image processing operation performed in the image sensor is provided. The image sensor may detect an object in an image or perform an autofocus operation by quickly performing pixel value sum operations.

While the present disclosure is described with reference to various embodiments or examples, those skilled in the art will understand that changes in form and details may be made without departing from the spirit and scope of the present disclosure as well as the appended claims and their equivalents. All changes or modifications derived from the meaning and scope of the claims and equivalents thereof are included in the scope of the present disclosure.

What is claimed is:

1. An image sensor comprising:
   an image generator including a plurality of pixels and configured to generate image data having pixel values corresponding to the plurality of pixels; and
   a focus manager configured to generate a first phase detection image and a second phase detection image based on pixel values for phase detection pixels among the pixels, to determine a first target region of interest including a preset object within regions of interest in the first phase detection image based on a result of performing first pixel value sum operations for pixels included in the regions of interest, to determine a second target region of interest corresponding to the first target region of interest in the second phase detection image, and to perform an autofocus operation based on a result of performing second pixel value sum operations for pixels included in the first target region of interest and the second target region of interest;
   wherein the focus manager is configured to generate a first integral image obtained by cumulatively adding up pixel values for pixels included in the first phase detection image, to generate a second integral image obtained by cumulatively adding up pixel values for pixels included in the second phase detection image, and to perform at least one sum operation among the first pixel value sum operations and the second pixel value sum operations based on target pixel values for target pixels included in the first integral image and the second integral image.

2. The image sensor according to claim 1, wherein the focus manager is configured to determine one of four corners of the first phase detection image to be an origin, determine a first integral region in which a first origin pixel corresponds to the origin in the first phase detection image, determine a pixel farthest from the first origin pixel in the first integral region to be a first representative pixel of the first integral region, and determine a pixel value for a first integral pixel to be a sum of the pixel values included in the first integral region from the first origin pixel to the representative pixel of the first integral region, wherein the first integral pixel has a location identical to the location of the first representative pixel within pixels included in the first integral image.

3. The image sensor according to claim 2, wherein the focus manager is configured to determine a second origin pixel corresponding to the origin within the pixels included in the second phase detection image, determine a second integral region, determine a pixel farthest from the second origin pixel in the second integral region to be a second representative pixel of the second integral region, and determine a pixel value for a second integral pixel to be a sum of pixel values included in the second integral region from the second origin pixel to the second representative pixel of the second integral region, wherein the second integral pixel has a location identical to that of the second representative pixel within pixels included in the second integral image.

4. The image sensor according to claim 1, wherein:
   the focus manager is configured to determine computation regions corresponding to patterns determined according to the object within the regions of interest, and
   wherein each of the first pixel value sum operations is a sum operation on pixel values included in each of the computation regions.

5. The image sensor according to claim 4, wherein the focus manager is configured to determine four target pixels for each of the plurality of computation regions.

6. The image sensor according to claim 1, wherein the focus manager is configured to generate a first phase line corresponding to the first target region of interest, generate a second phase line corresponding to the second target region of interest, and perform the autofocus operation based on a difference between the first phase line and the second phase line.

7. The image sensor according to claim 6, wherein the focus manager is configured to generate the first phase line based on average pixel values for pixels in respective columns within pixels included in the first target region of interest and generate the second phase line based on average pixel values for pixels in respective columns within pixels included in the second target region of interest.

8. The image sensor according to claim 7, wherein each of the second pixel value sum operations is a sum operation on pixel values for pixels included in a single column within pixels included in the first target region of interest and the second target region of interest.

9. The image sensor according to claim 8, wherein the focus manager is configured to generate the first phase line and the second phase line based on a result of performing the second pixel value sum operations.

10. A method of performing an operation in an image sensor, the method comprising:
   generating image data including pixel values corresponding to pixels in an image;
   generating a phase detection image having a phase difference based on pixel values for phase detection pixels included in the image data;

generating an integral image corresponding to the phase detection image;

selecting a sum operation including adding up pixel values for pixels included in a region of the phase detection image among operations performed on the phase detection image;

determining target pixels corresponding to the region within pixels included in the integral image; and performing the sum operation based on pixel values for the target pixels.

11. The method according to claim 10, wherein generating the integral image comprises:

determining one of corners of the phase detection image to be an origin;

setting up an integral region in which pixels values are added up from an origin pixel corresponding to the origin in the phase detection image;

determining a pixel farthest from the origin pixel in the integral region to be a representative pixel of the integral region; and determining a pixel value of an integral pixel having a location identical to that of the representative pixel within the pixels included in the integral image to be a sum of pixel values included in the integral region.

12. The method according to claim 10, wherein selecting the sum operation comprises:

generating filters for detecting a preset object; and determining, to be the sum operation, an operation corresponding to a component for a filter that maintains a pixel value among components of the filters.

13. The method according to claim 12, wherein the component of a filter that maintains the pixel value is 1 or −1.

14. The method according to claim 13, wherein the components of the filter comprise 1 or −1, and the filter is applied to the region.

15. The method according to claim 12, further comprising determining a region of the phase detection image which includes the object based on a result of performing the sum operation.

16. The method according to claim 11, wherein determining the target pixels comprises determining four pixels corresponding to four corners of the region to be the target pixels.

17. The method according to claim 16, wherein performing the sum operation comprises:

calculating a difference between a sum of pixel values for a pixel closest to the origin pixel and a pixel farthest from the origin pixel among the four target pixels and a sum of remaining pixel values; and determining a result of the sum operation to be the difference in sum of the pixel values.

18. The method according to claim 10, wherein selecting the sum operation comprises:

detecting a target region of interest including a preset object within regions of interest in the phase detection image; and determining a sum of pixel values for pixels included in a single column within pixels included in the target region of interest to be the sum operation.

19. The method according to claim 18, wherein performing the sum operation comprises determining a difference between a last pixel and a first pixel included in the single column within pixels of the integral image corresponding to the region of interest to be a result of the sum operation.

20. The method according to claim 19, further comprising:

generating a phase line corresponding to the region of interest based on a result of performing the sum operation; and determining the phase difference based on the phase line.

* * * * *